United States Patent
Boyer et al.

[15] 3,662,673
[45] May 16, 1972

[54] TEXTURED PROTEIN PRODUCTS

[72] Inventors: Robert A. Boyer, Creve Coeur; Arthur A. Schulz, St. Louis; Edward V. Oborsh, Ballwin; Arthur V. Brown, Fenton, all of Mo.

[73] Assignee: Ralston Purina Company, St. Louis, Mo.

[22] Filed: May 27, 1969

[21] Appl. No.: 828,389

[52] U.S. Cl. .................................. 99/17, 260/123.5
[51] Int. Cl. ............................................... A23j 1/14
[58] Field of Search ........................... 99/98, 17, 14

[56] References Cited

UNITED STATES PATENTS

| | | | |
|---|---|---|---|
| 2,182,175 | 12/1939 | Gates | 99/98 |
| 2,785,069 | 3/1957 | Dudman | 99/14 |
| 2,874,049 | 2/1959 | Pader et al. | 99/14 |
| 3,141,776 | 7/1964 | Kaufmann et al. | 99/98 X |
| 3,142,571 | 7/1964 | McAnelly | 99/14 |

*Primary Examiner*—A. Louis Monacell
*Assistant Examiner*—William Andrew Simons
*Attorney*—Robert W. Brukardt and Edward H. Renner

[57] ABSTRACT

A method for producing expanded, textured protein products which comprises mixing oleaginous seed materials and an aqueous liquid in a ratio of between 1:0.2 and 1:4 to form a mixture having a pH of between about 4 and 7; generating heat internally in the mixture by means of radiant energy (e.g. infrared, microwave, induction ovens) to expand the mixture at substantially atmospheric pressure to form an expanded product, setting the expanded product to form an expanded substantially water-insoluble irreversible cross-linked structure; and subsequently cooling the expanded product.

10 Claims, No Drawings

TEXTURED PROTEIN PRODUCTS

BACKGROUND OF THE INVENTION

The present invention relates to edible protein products and, more particularly, to those protein products which can be expanded under controlled conditions at atmospheric pressure.

Various types of expanded food products are presently known in the art, e.g., bread, cakes, etc. These products contain high percentages of starch and low concentrations of protein (about 20 percent or less) and because of this composition are not ordinarily used in food products requiring extreme cooking conditions. Such products lack physical stability in the presence of high heat and moisture surroundings and tend to either form a dough mass or lose their physical integrity. Other expanded products are known to the art wherein such products contain a relatively high concentration of protein and are primarily used as food additives or supplements. Due to the high protein content, these products have excellent physical stability and will withstand extreme heat and moisture conditions. Products containing moderately high concentrations of protein are presently produced by methods which require the use of both heat and superatmospheric pressure, e.g., extrusion methods. In view of such limited procedures, it would be extremely desirable to provide a process which would produce expanded protein products and would eliminate the necessity of employing the massive and heavy duty mechanical equipment necessary in currently known methods to obtain the required heat and superatmospheric pressures.

SUMMARY

In accordance with the present invention, an expanded, textured protein product is produced in a method which comprises the steps of mixing together ingredients comprising proteinaceous material containing at least about 35 percent by weight protein and an aqueous liquid, subjecting the mixture to elevated temperatures, said temperatures being sufficient to cause expansion of the mixture to form an expanded, substantially water-insoluble, irreversible cross-linked structure, and cooling the resulting product.

The product formed in accordance with the invention is an expanded, irreversible gel having excellent physical properties, e.g., texture and moisture stability, which properties make it particularly suitable for various food uses. The product sorbs several times its weight in water, has excellent chewy texture, and can retain these excellent physical properties even after being subjected to extreme heat and moisture conditions such as by cooking. The product also can be formed to exhibit a pleasant crunchy texture when dry.

PREFERRED EMBODIMENTS OF THE PRESENT INVENTION

The present invention is best accomplished by mixing together oleaginous seed materials containing at least about 35 percent by weight protein and an aqueous liquid such as water. Such oleaginous seed materials include processed soybean, isolated soy protein, soy flour, defatted soy flakes, cottonseed meals, sesame seed meals, peanut meals and the like. Partially hydrolyzed protein materials may be employed where the degree of hydrolysis is such that the protein aqueous liquid mixture expands to form the product of the invention. The proteinaceous material should contain at least about 35 percent by weight protein on a dry basis in order to obtain the desired physical properties in the finished product, e.g., the desired texture or degree of expansion. Since the particular product of the invention has a variety of uses, it is essential that the product substantially maintain the above described properties under a variety of conditions, for example, it should maintain its physical characteristics and integrity under cooking conditions. In contrast, bread products containing substantially less protein do not maintain their integrity under such conditions and tend to disintegrate. The most favorable results are obtained when the ratio of protein material to the aqueous liquid is from about 1:0.2 to about 1:4 and preferably about 1:0.4 to about 1:2 by weight. It is to be understood that other ingredients such as color, flavoring and the like may be added to the mixture to obtain specific end products and that appropriate chemicals may be added to modify the protein properties.

After mixing together the proteinaceous material and the aqueous liquid, it may be necessary to adjust the pH of said mixture to provide the necessary conditions for expanding the product. It has been found that the best results are obtained where the mixture has a final pH of from about 4.5 to about 7 and preferably from about 5.5 to about 6.5. Where the final pH is below about 4.5 for most protein or about 4.0 for partially hydrolyzed protein, it has been found that the product gels and discolors to form a crumbly product. Where the final pH is above about 7, it has been found that the resulting product has poor color and undesirable physical characteristics. A number of materials may be added to adjust the pH or to modify the protein characteristics. Some of the most suitable chemical compositions are sodium hydroxide, calcium hydroxide, citric acid, calcium carbonate, calcium chloride, calcium oxide, ammonium hydroxide, ammonium carbonate, ammonium bicarbonate, sodium carbonate, trisodium phosphate, sodium bicarbonate potassium phosphate, potassium carbonate, potassium bicarbonate and the like. Fat has also been found to be a useful modifier.

The protein material aqueous liquid mixture is then subjected to elevated temperatures at atmospheric pressure to accomplish expansion and heat setting of the mixture. The elevated temperatures may be attained by means of heat sources such as radiant energy (e.g. infrared, microwave, induction ovens). It has been found that different heat sources tend to produce expanded products having different physical characteristics. For example, electronic wave sources produce products having a soft, flexible surface, whereas infrared radiant sources generally tend to produce products having a less flexible, hard surface. It is preferred that electronic waves be used, since some other heat sources tend to form an undesirable hard surface or crust on the expanded product caused by heat denaturation of the protein or surface dehydration. The temperatures employed to achieve and retain the expanded structure of the product are dependent upon the heat source. For example, microwave treatment would be dependent mainly upon the redisence time of the product being exposed to the electronic waves and power input. That is to say, since the temperature of the product generally does not exceed about 212° F. (the boiling point of water), the residence time and power would determine the desired amount of expansion, final moisture content, etc. of the final product. Radiant heat sources such as infrared must be subject to closer control, since the temperature must be sufficient to obtain the desired amount of expansion, yet not excessive in the sense as to cause the formation of an undesirable crust on the surface of the product.

After the product has been heated and expanded in accordance with the above procedures, it may be cooled or dehydrated and subsequently processed into a suitable form for further processing into various food products.

The oleaginous seed materials employed in the invention may be in a variety of forms. For example, full fat soy flours and defatted soy flours have been found to produce expanded products which offer the highly desirable characteristics hereinbefore discussed. Materials containing a higher percentage of protein, including isolated soy protein, may also be employed to obtain the same desirable characteristics.

The product of the invention is, in essence, an irreversible cross-linked structure which has been expanded and heat-set to retain the expanded shape or configuration. The product in that form exhibits excellent physical properties. For example, a dried product of the invention has been found to sorb about 4 times its weight in water and yet retain its desirable physical properties. There is no physical deterioration such as crumbling due to sorption of large amounts of moisture as is characteristic of bread-type products which tend to physically disintegrate upon exposure to excessive amounts of water. Furthermore, the product of the invention substantially maintains its integrity and desirable physical characteristics even when subjected to severe wet cooking conditions such as cooking under high temperatures and pressures. Because of the above described properties, the product of the invention is suitable for use in a variety of food products.

A significant advantage of the present invention is found in a process of making the product. Said product may be produced by expanding at substantially atmospheric pressure, whereas heretofore similar types of products could only be made in the presence of heat and superatmospheric pressure. It is essential to note that expansion at substantially atmospheric pressure is possible through the combination of conditions which are used in the process, such as the amount of protein present in the protein material, the amount of aqueous liquid present in relation to the protein material and the final pH of the resulting mixture of protein material and aqueous liquid. Furthermore, the particular process of the invention obviates the necessity of employing heavy duty, massive mechanical equipment currently necessary to generate superatmospheric pressures to produce similar types of products.

The following examples are illustrative of the invention and are not intended to limit the scope thereof:

EXAMPLE 1

A. One hundred grams of isolated soy protein (95 percent protein, pH 4.5) was mixed with 175 ml. of water. The ingredients were mixed in a Hobart food mixer for about 5 minutes and the mixture had a pH of about 4.5. The mixture was formed into a small loaf and placed into a microwave oven (8.8 Kw, 115–200 v, 2,450 mc) for a period of about 3½ minutes. The resulting product was removed from the oven and cooled. The product was sliced and the internal structure was observed to be cellular and the product would not tear easily. A slice of the material was dried, weighed and subsequently placed in water and weighed again. It was found that the slice sorbed 4 times its original weight in water and would not tear easily even though containing the large amount of water.

B. In a comparative example, the above procedures were substantially repeated, except that wheat flour (14 percent protein, pH 6.8) was substituted for the isolated soy protein. The resulting product was observed to have a cellular structure similar to that obtained in the product as described above; however, when placed in water, the wheat flour product lost its integrity and separated into individual particles.

EXAMPLE 2

The procedures of Example 1A were substantially repeated, except that 2.5 grams of sodium bicarbonate were added to the protein-water mixture and said mixture had a pH of about 5.5. The resulting product had substantially the same desirable properties as that produced in Example 1A.

EXAMPLE 3

The procedures of Example 1A were substantially repeated, except that 15 mls. of a 20 percent solution of trisodium phosphate were added to the protein-water mixture and said mixture had a pH of about 5.4. The resulting product had substantially the same desirable properties as that produced in Example 1A.

EXAMPLE 4

The procedures of Example 2 were substantially repeated, except that 50 gms. of vegetable fat and 150 mls. of water were added to form the mixture and said mixture had a pH of about 6.0. The properties of the resulting product were similar to those produced in Example 2, except that it was softer and more tender.

EXAMPLE 5

The procedures of Example 1A were substantially repeated, except that defatted soy flour was substituted for the isolated soy protein. The pH of the flour-water mixture was about 6.5. The resulting product had a desirable expanded, tender texture.

EXAMPLE 6

The procedures of Example 5 were substantially repeated, except that 10 mls. of a 20 percent trisodium phosphate solution and 90 mls. of water were added to form the flour-water mixture, said mixture having a pH of about 6.9. The resulting product had the desirable properties of the product of Example 5.

EXAMPLE 7

The procedures of Example 5 were substantially repeated, except that 2.5 grams of sodium bicarbonate and 150 mls. of water were added to form the mixture, said mixture having a pH of about 6.9. The product was substantially the same as that produced in Example 5.

EXAMPLE 8

The procedures of Example 5 were substantially repeated, except that 15 grams of vegetable fat were added to the mixture. The resulting product was similar to that of Example 5.

EXAMPLE 9

The procedures of Example 5 were substantially repeated, except that 20 mls. of a 20 percent trisodium phosphate solution and 95 mls. of water were added to form the mixture, the mixture having a pH of about 7.3. To the mixture was thoroughly admixed 10 mls. of a saturated citric acid solution to re-adjust the pH to about 4.6. The product retained its integrity after subjecting it to severe cooking conditions, e.g., retorting.

EXAMPLE 10

The procedures of Example 1A were substantially repeated, except that 100 grams of isolated soy protein (about 95 percent by weight protein), 130 grams of defatted soy flour and 175 mls. of water were admixed to form the protein-water mixture. The resulting mixture had a pH of about 5.5. The resulting product had substantially the same desirable properties as that produced in Example 1A.

EXAMPLE 11

The procedures of Example 10 were substantially repeated, except that 4 grams of sodium bicarbonate and 350 mls. of water were added to form the mixture. The mixture had a pH of about 6.5. The product produced was substantially the same as that produced in Example 10.

EXAMPLE 12

The procedures of Example 11 were substantially repeated, except that 75 grams of vegetable fat were added to the mixture. The resulting product was substantially the same as that produced in Example 11, except that the product was softer and more tender.

EXAMPLE 13

The procedures of Example 1A were substantially repeated, except that 150 grams of isolated protein (about 95 percent by weight protein, pH 4.5), 50 grams of edible dairy whey, 5 grams of sodium bicarbonate and 275 mls. of water were admixed to form the mixture. The pH of the resulting mixture

EXAMPLE 14

The procedures of Example 1A were substantially repeated, except that 100 grams of full fat soy flour (36 percent by weight protein) and 185 mls. of water were admixed to form the mixture. The mixture had a pH of about 6.7 and the product exhibited desirable expanded and tender properties.

EXAMPLE 15

The procedures of Example 1A were substantially repeated, except that 100 grams of cottonseed flour (65 percent by weight protein) and 175 mls. of water were admixed to form the mixture. The mixture had a pH of 6.0 and the resulting product had desirable expanded and tender properties.

EXAMPLE 16

The procedures of Example 15 were substantially repeated, except that 100 grams of defatted peanut flour (48 percent by weight protein) was substituted for the cottonseed flour. The pH of the mixture was about 7.2 and the resulting product exhibited substantially the same physical properties as that produced in Example 15.

EXAMPLE 17

The procedures of Example 1A were substantially repeated, except that 100 grams of defatted sesame flour (36 percent by weight protein) and 125 mls. of water were admixed to form the mixture. The pH of the resulting mixture was about 6.4 and the resulting product exhibited substantially the same desirable physical properties as that produced in Example 1A.

EXAMPLE 18

The procedures of Example 1A were substantially repeated, except that 100 grams of a partially hydrolyzed isolated soy protein (90 percent by weight protein), 2.5 grams of sodium bicarbonate and 125 mls. of water were added to form the mixture. The pH of the resulting mixture was about 6.4. The resulting product exhibited desirable expanded and textured properties.

EXAMPLE 19

The procedures of Example 1A were substantially repeated, except that 100 grams of isolated soy protein (95 percent by weight protein), 15 grams of a 20 percent solution of trisodium phosphate and 135 mls. of water were admixed to form the mixture. The resulting expanded product was cut into thin slices and deep-fried in vegetable fat for about 2 minutes at a temperature of about 350° F. The product had an excellent yellow color with a texture similar to that of deep-fried shrimp products.

EXAMPLE 20

One hundred grams of soy flour (50 percent by weight protein), 35 grams of vegetable fat, 15 mls. of 20 percent solution of trisodium phosphate and 125 mls. of water were admixed to form a mixture of the ingredients. This mixture had a pH of about 7.8. To this mixture was added 40 mls. of a saturated citric acid solution to adjust the final mixture to a pH of about 5.0. The resulting mixture was passed through an open-end tube 1 inch in diameter together with steam at a temperature of about 212° to 215° F. No back pressure was developed in the tube. The product emerging from the other end of the tube was an assortment of expanded irregular shaped granules having the desirable physical properties of other products prepared by other examples hereinbefore described.

EXAMPLE 21

114 grams of the non-expanded, doughy mixture as prepared in Example 2 was admixed with the following ingredients:

| | | |
|---|---|---|
| Albumen | 7.5 | gm. |
| Bacon Flavor | 25 | gm. |
| Ham Flavor | 15 | gm. |
| Smoked Salt | 3.5 | gm. |
| Bacon Fat | 75 | gm. |
| Smoke Flavor | 20 | ml. |
| Red Food Color | 15 | ml. |
| Red Brown Food Color | 5 | ml. |

All ingredients were thoroughly mixed in a food mixer to obtain a homogeneous blend. The mixture was then expanded in accordance with the procedures described in Example 1A to produce a bacon flavored, snack-type food product. The resulting product had excellent flavor and color and had a palatable, crunchy texture.

EXAMPLE 22

The expanded product as produced in accordance with the procedures of Example 2 was passed through a food chopper to produce small particles of the product. 114 grams of the chopped product were mixed with the following ingredients:

| | | |
|---|---|---|
| Albumen | 7.5 | gm. |
| Bacon Flavor | 40 | gm. |
| Ham Flavor | 25 | gm. |
| Smoked Salt | 3.75 | gm. |
| Bacon Fat | 37.5 | gm. |
| Smoke Flavor | 10 | ml. |
| Red Food Color | 15 | ml. |
| Red Brown Food Color | 5 | ml. |
| Water | 75 | ml. |

The resulting mixture was placed into a drying oven at a temperature of about 180° F. for a period of about 1 hour. The product produced was a tasty, chewy, crunchy, textured food product having a flavor similar to that of bacon.

EXAMPLE 23

The procedures of Example 1A were substantially repeated, except that 100 grams of partially hydrolyzed isolated soy protein (90 percent by weight protein), 100 grams water, 4 grams of calcium carbonate were used to form the mixture. 10 grams of a saturated solution of citric acid were used to adjust the final pH of the mixture to about 4.1. The resulting product had substantially the same properties as that produced in Example 1A. The material maintained excellent physical integrity when subjected to boiling water.

EXAMPLE 24

The procedures of Example 1A were substantially repeated, except that 100 grams of isolated soy protein (95 percent by weight protein), 200 grams water and 4 grams of calcium oxide were used to form the mixture. The pH was adjusted to about 6.5 with citric acid. The resulting product had a tough expanded texture substantially resembling the product of Example 1A.

EXAMPLE 25

1,500 parts of isolated soy protein (95 percent by weight protein), 37.5 parts sodium bicarbonate, 5.25 parts dry caramel and 2,625 parts water were mixed in a Hobart food mixer. The mixture was placed in a teflon coated waffle iron having a surface temperature of 350° F. The mixture expanded and set at about 205° F. to form a thick waffle having a cellular texture. The material had excellent physical integrity.

EXAMPLE 26

17.5 pounds of the material of Example 25 were chopped and mixed with the following ingredients:

| | |
|---|---|
| Spun Soy Protein Fiber | 7.50 |
| Isolated Soy Protein | 0.650 |
| Edible Whey | 2.70 |
| Albumen | 0.50 |
| Beef Flavor | 1.10 |
| Salt | 0.50 |
| (Caramel) | ( 44 grams) |
| (Water) | (454 grams) |
| TiO$_2$ | 20 grams |
| Water | 25 0 |

The resulting product formed a superior meat extender and could be mixed with fresh lean ground meat in proportions of up to 50 percent by weight to form a meat patty equivalent or superior to fresh hamburger.

In place of the particular oleaginous seed materials, pH conditions and heating sources, other oleaginous seed materials, pH conditions and heating sources may be employed as hereinbefore described to obtain expanded, textured protein products having substantially the same properties.

I claim:

1. A method of producing an expanded, textured protein product comprising mixing an oleaginous seed material containing at least about 35 percent by weight protein and an aqueous liquid, the ratio of oleaginous material to aqueous liquid being between about 1:0.2 and 1:4, to form a mixture having a pH of between about 4 and 7; generating heat internally in the mixture to expand the mixture at substantially atmospheric pressure to form an expanded product, setting the expanded product to form an expanded substantially water-insoluble irreversible cross-linked structure; and subsequently cooling the expanded product.

2. The method according to claim 1 wherein the oleaginous seed material is selected from the group consisting of soy protein, cotton seed flour, peanut flour and sesame flour.

3. The method according to claim 1 wherein the oleaginous seed material is soy flour.

4. The method according to claim 1 wherein the oleaginous seed material is a mixture of isolated soy protein and edible dairy whey.

5. The method according to claim 1 wherein the oleaginous seed material is partially hydrolyzed isolated soy protein.

6. The method according to claim 1 wherein the aqueous liquid is water.

7. The method according to claim 1 wherein a modifying material selected from the group consisting of fat and acid is mixed to the mixture of oleaginous material and aqueous liquid.

8. The method according to claim 1 wherein a modifying material selected from the group consisting of ammonium hydroxide, ammonium carbonate, ammonium bicarbonate, sodium carbonate, sodium bicarbonate, tri-sodium phosphate, potassium phosphate, potassium bicarbonate, potassium carbonate, calcium carbonate, calcium chloride, calcium oxide and calcium hydroxide is added to the mixture of oleaginous material and aqueous liquid.

9. The method according to claim 1 wherein the heat is generated by exposing the mix to a source of radiant energy.

10. The method according to claim 9 wherein the source of radiant energy is a microwave source.

* * * * *

UNITED STATES PATENT OFFICE
CERTIFICATE OF CORRECTION

Patent No. 3,662,673   Dated May 16, 1972

Inventor(s) Robert A. Boyer et al

It is certified that error appears in the above-identified patent and that said Letters Patent are hereby corrected as shown below:

Column 2, line 46 - "redisence" should read "residence".

Column 7, lines 1, 3, 5 and 10 - the number "0" should be replaced with "lbs."

Column 7, lines 2, 4 and 6 - the number "0" (second occurrence) should be replaced with "lbs."

Signed and sealed this 20th day of February 1973.

(SEAL)
Attest:

EDWARD M. FLETCHER, JR.          ROBERT GOTTSCHALK
Attesting Officer                Commissioner of Patents